(12) United States Patent
Vignotto et al.

(10) Patent No.: US 6,695,484 B2
(45) Date of Patent: Feb. 24, 2004

(54) DEVICE FOR MEASURING THE ANGULAR SPEED OF ROLLING CONTACT BEARINGS

(75) Inventors: Angelo Vignotto, Turin (IT); Claudio Savarese, Airasca (IT)

(73) Assignee: S.K.F. Industrie S.p.A., Turin (IT)

( * ) Notice: Subject to any disclaimer, the term of this patent is extended or adjusted under 35 U.S.C. 154(b) by 0 days.

(21) Appl. No.: 10/167,783

(22) Filed: Jun. 12, 2002

(65) Prior Publication Data

US 2003/0031391 A1 Feb. 13, 2003

(30) Foreign Application Priority Data

Aug. 8, 2001 (IT) .................................. TO2001A000802

(51) Int. Cl.⁷ .............................................. F16C 19/26
(52) U.S. Cl. ...................................................... 384/448
(58) Field of Search ................................. 384/448, 446, 384/544, 589, 543

(56) References Cited

U.S. PATENT DOCUMENTS 5,575,568 A    11/1996  Rigaux et al.
5,969,518 A    10/1999  Merklein et al.

*Primary Examiner*—Lenard A. Footland
(74) *Attorney, Agent, or Firm*—Merchant & Gould, P.C.

(57) ABSTRACT

Device (1) for measuring the angular speed of rolling contact bearings (2) presenting a protective shield (5) which is mounted onto the rolling contact bearing (2), a phonic wheel (6) which is mounted under the protective shield (5), and a sensor (7), which is mounted onto a stud (8) which is outside the rolling contact bearing (2) and which is provided with an external frontal surface (11) which faces the phonic wheel (6); the protective shield (5) is defined by a rigid wall (18), which is mounted onto a fixed race of the rolling contact bearing (2), and which is provided with at least one passing housing (22) for housing the frontal surface (11) of the sensor (7) and for isolating the frontal surface (11) itself from the outside by means of a rubber membrane (23) which is suitable for remaining in direct contact with the frontal surface (11).

5 Claims, 1 Drawing Sheet

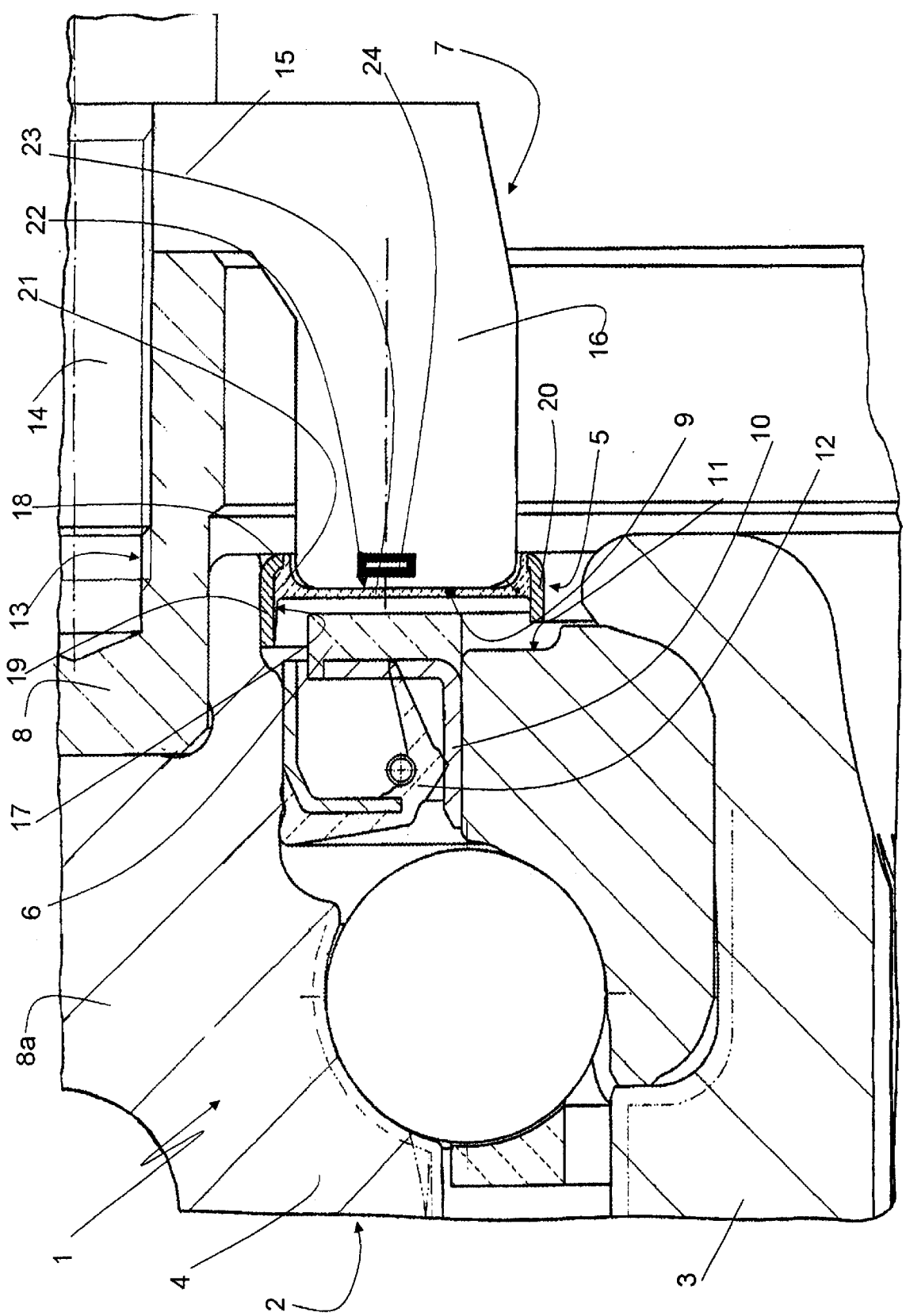

DEVICE FOR MEASURING THE ANGULAR SPEED OF ROLLING CONTACT BEARINGS

DESCRIPTION

The present invention relates to a device for measuring the angular speed of rolling contact bearings.

The U.S. Pat. Nos. 5,575,568 and 5,969,518 relate to and make known a device for measuring the angular speed of rolling contact bearings which comprises a protective shield which is mounted onto the rolling contact bearing, a phonic wheel which is mounted under the protective shield, and a sensor, which is mounted onto a stud which is outside the rolling contact bearing and which is provided with an external frontal surface which faces towards the phonic wheel and a reading cell which is arranged in a position that is adjacent to the frontal surface itself.

Even though, in the U.S. Pat. No. 5,575,568, the sensor is mounted in such a way that the frontal surface and the protective shield form a gap in relation to each other, in the U.S. Pat. No. 5,969,518, the sensor is mounted with the frontal surface arranged in direct contact with the protective shield itself with the further advantage that the majority of the frontal surface is protected from the intrusion of foreign objects.

It should, however, be taken into consideration that in both the U.S.A. patents which have been cited above, the sensor is not mounted directly onto the rolling contact bearing but is mounted by means of positioning a stud between the rolling contact bearing and the sensor itself, or by means of a non-homogeneous chain inside which there are varying allowances, which means that it is particularly difficult to obtain a gap of the necessary size and that it is also difficult to ensure that the frontal surface is in direct contact with the protective shield other than under ideal conditions of assembly, or under conditions in which there are considerably reduced allowances to the absolute detriment of the relevant manufacturing costs.

Furthermore, in both the U.S.A. patents which have been cited above the protective shield must necessarily be made of non-ferromagnetic material so that its own characteristics do not impinge upon the readings carried out by the sensor and, also, it must present a somewhat reduced thickness in order to avoid weakening the signal emitted by the phonic wheel in correspondence with the frontal surface of the sensor. The necessity of making the protective shield out of a non-ferromagnetic material is not only detrimental to the above-mentioned manufacturing costs, but it also means that it is difficult to reduce the thickness of the protective shield itself without resorting to measures which would, once again, be rather expensive.

The aim of the present invention is to produce a device for measuring the angular speed of rolling contact bearings, which will ensure that it is possible to position the sensor as near as possible to the phonic wheel and will also ensure that it is possible to protect the phonic wheel itself from the intrusion of foreign objects and will also eliminate the above-mentioned disadvantages while rendering the manufacture of such devices as cost-effective as possible.

According to the present invention a device for measuring the angular speed of rolling contact bearings will be produced comprising a protective shield which is mounted onto the rolling contact bearing, a phonic wheel which is mounted under the protective shield, and a sensor, which is mounted onto a stud which is outside the rolling contact bearing and which is provided with an external frontal surface which faces the phonic wheel; the device is characterised by the fact that the protective shield is defined by a rigid wall, which is mounted onto a fixed race of the rolling contact bearing, and which is provided with at least one passing housing for housing the frontal surface of the sensor; the passing housing is isolated from the outside and is delimited by the part which faces towards the phonic wheel by a rubber membrane which is suitable for remaining in contact with the frontal surface of the sensor.

The present invention will now be described with reference to the attached drawing, which illustrate a non-limiting form of embodiment of the present invention, with some parts in section and some parts removed for reasons of clarity.

With reference to FIG. 1, the number 1 indicates, in its entirety, a device for measuring the angular speed of a rolling contact bearing w comprising an inner rotating race 3 and an outer fixed race 4.

The device 1 comprises a protective shield 5 which is mounted onto the fixed race 4, a phonic wheel 6 which is mounted under the protective shield 5, and a sensor 7, which is mounted onto a stud 8 which is outside the rolling contact bearing 2 and which is provided with an external frontal surface 9 which faces towards the phonic wheel 6.

In particular, the phonic wheel 6 is mounted onto the rotating race 3 by means of a support element 10, which axially supports the phonic wheel 6 itself outside an external surface 11 of the rotating race 3, and which is coupled with a sealing element 12 in the form of a lip.

The stud 8 is integral with a flange 8a of the fixed race 4 and presents a threaded hole 13 which is engaged by a fixing screw 14 of the sensor 7, which comprises a support section 15 which is crossed by the fixing screw 13 itself, and an elongated reading section 16 which extends parallel to an axis of the rolling contact bearing 2 towards the protective shield 5.

The protective shield 5, which can equally well be made of ferromagnetic or non-ferromagnetic material, presents a substantially concave annular shape and comprises a concave section 17 which faces the phonic wheel 6 and which is defined by a rigid wall 18 which is transverse to the above-mentioned axis of the rolling bearing 2, and by two cylindrical walls 19 and 20 which are integral with the rigid wall 18, and of which the wall 19 is mounted onto the fixed race 4, while the wall 20 is arranged frontally to the surface 11 of the rotating race 3.

The protective shield 5 also comprises a layer of rubber material 21 which is arranged inside the section 17 in direct contact with the rigid wall 18, while the rigid wall 18 is provided with one of more passing housings 22 for housing the frontal surface 9 (???? 11 ????) of the sensor 7. In the example which is illustrated and in the following description, reference is made to only one passing housing 22, yet a greater number of housings 22 results in greater freedom in terms of assembling the protective shield 5, although only one of these housings 22 is engaged by the sensor 7.

In particular, the housing 22 is obtained via the rigid wall 18 and inside the layer 21 in order to be able to accommodate within its own interior a part of the elongated section 16 in order to isolate the frontal surface 9 of the sensor 7 from the outside.

The housing 22 is delimited, on the part which is facing towards the phonic wheel 6, by a rubber membrane 23, which presents a thickness which is less that a thickness of the rigid wall 18, and which is suitable for remaining in direct contact with the frontal surface 9 of the sensor 7 even when assembly conditions differ from those which are herein described.

There is a very reduced gap between the membrane 23 and the phonic wheel 6 and, taking into consideration the scant thickness of the membrane 23 itself and the fact that such a membrane is made of rubber material, the result is that an extremely clear signal is emitted by the phonic wheel 6 to the sensor 7, or rather to a reading cell 24 of the sensor 7, which is arranged in an inward position in relation to the frontal surface 9.

Furthermore, this kind assembly means that it is possible to eliminate any dispersions which are due to the tolerances while permitting the frontal surface 11 to remain in substantial contact with the membrane 23, or rather adjacent to it in the worst conditions and with partial interference equal to the sum of the various tolerances in the best conditions.

It is obvious from the above description that the device 1 permits both a reduction in the distance between the sensor 7 and the phonic wheel 6 and the elimination of any eventual elements of disturbance which may usually be found along the route followed by the signal between the phonic wheel 6 and the sensor 7 themselves and that it also permits the positioning of the reading cell 24 in a protected position inside the elongated reading portion 16.

It is intended that the present invention should not be limited to the forms of embodiment herein described and illustrated, which are to be considered as examples of forms of embodiment of a device for measuring the angular speed of rolling contact bearings, and which may be subject to further modifications relating to the shape and arrangement of the parts, as well as details pertaining to construction and assembly.

What is claimed is:

1. Device (1) for measuring an angular speed of rolling contact bearings comprising a protective shield which is mounted onto the rolling contact bearing, a phonic wheel which is mounted under/below the protective shield, and a sensor, which is mounted onto a stud which is outside the rolling contact bearing and which is provided with an external frontal surface which faces the phonic wheel; wherein the protective shield is defined by a rigid wall, which is mounted onto a fixed race of the rolling contact bearing, and which is provided with at least one passing housing for housing the frontal surface of the sensor; the passing housing is isolated from the outside and is delimited by the external front surface which faces towards the phonic wheel by a rubber membrane which is suitable for remaining in contact with the frontal surface of the sensor.

2. Device according to claim 1, wherein the rubber membrane presents a thickness which is less than that of a thickness of the rigid wall of the protective shield.

3. Device according to claim 2, wherein the protective shield presents a substantially concave annular shape and comprises a concave section which faces towards the phonic wheel and which is partially filled with a layer of rubber material which is arranged so that it is in contact with the said rigid wall.

4. Device according to claim 3, wherein the phonic wheel is supported by a rotating race of the rolling contact bearing and is arranged in such a way that it directly faces the rubber membrane.

5. Device according to claim 1, further comprising a reaching cell which is arranged in an inward position in relation to the frontal surface.

* * * * *